United States Patent [19]

Pentith

[11] 4,262,478
[45] Apr. 21, 1981

[54] AGRICULTURAL MACHINE

[75] Inventor: Gerald R. O. Pentith, Derby, England

[73] Assignee: Brockadale Developments Limited, Derby, England

[21] Appl. No.: 117,518

[22] Filed: Feb. 1, 1980

[30] Foreign Application Priority Data

Feb. 7, 1979 [GB] United Kingdom ............... 04405/79

[51] Int. Cl.³ ........................................... A01D 39/00
[52] U.S. Cl. ....................................... 56/341; 100/88
[58] Field of Search .................... 56/341, 343; 100/88, 100/5, 87

[56] References Cited

U.S. PATENT DOCUMENTS

| | | | |
|---|---|---|---|
| 2,627,223 | 2/1953 | Berge | 100/88 |
| 3,797,215 | 3/1974 | Kopaska | 56/341 |
| 3,815,344 | 6/1974 | Kucera | 56/341 |
| 4,173,112 | 11/1979 | Meiners | 56/341 |
| 4,176,596 | 12/1979 | Sacht | 56/341 |
| 4,205,513 | 6/1980 | Shokoples | 56/341 |

Primary Examiner—Paul J. Hirsch
Attorney, Agent, or Firm—Trexler, Wolters, Bushnell & Fosse, Ltd.

[57] ABSTRACT

According to the present invention an agricultural machine for forming a round bale of windrowed fibrous material comprises a displaceable chassis carrying spaced apart side plates defining the width of a bale-forming chamber, a pick-up device located towards a forward end of the chassis and adapted to pick-up fibrous material from the ground and to discharge the fibrous material on to a carrying surface, which extends generally horizontally, of a first, fixed position belt conveyor defining the bottom of the chamber, and having a head end adjacent the pick-up device and a return end remote from the pick-up device, and serving to carry the fibrous material away from the pick-up device, and a plurality of additional belt conveyors each having an active surface adapted to co-operate with the carrying surface of the first, fixed position belt conveyor in the forming of a bale by the rolling of fibrous material, at least one of the additional belt conveyors being movable by having one end pivotably mounted, so that its other end is arcuately movable from an inner position to an outer position as the bale diameter progressively increases, means to urge the movable conveyor(s) towards the inner position and means to displace at least one of the belt conveyors whereby a finished bale may be discharged from a rearward end of the machine.

17 Claims, 7 Drawing Figures

AGRICULTURAL MACHINE

This invention relates to an agricultural machine for forming a round bale of windrowed fibrous material e.g. hay, straw, wilted silage.

Known machines e.g. such as is described in British specification No. 1,465,641 and U.S. Pat. No. 3,722,197 for instance, work on the principle of employing a lower, endless conveyor in conjunction with an upper, endless belt conveyor, the latter incorporating a belt loop take-up/pay-out device whereby, as a bale is built up from zero diameter to its required finished diameter, e.g. 5-ft., by rolling the fibrous material between opposed belt surfaces, the belt contained in the loop is gradually deployed but the bale density remains constant from core to periphery which is not always required. A belt loop is avoided in another type of machine, e.g. such as is described in British patent specification No. 1,490,384, which produces a soft centred bale, again without the ability to vary this.

After a bale of the required diameter has been formed, known machines of whatever kind, usually employ a wrapping device whereby twine is applied to the external periphery of the bale, as the latter continues to be rotated by the machine, by several passes of a twine applying device which is displaced, in shuttle fashion, from side to side of the machine until the desired number of twine wraps has been applied. In principle such known machines form a reasonably satisfactory bale from the view point of speed of formation but are relatively complex and hence costly to maintain, while furthermore the securing of a formed bale by twine leads to damage by weathering, and to a depth of several inches, of the fibrous material around the outside of the entire periphery of the bale.

The basic object of the present invention is to provide a machine having a capacity to vary the bale density to suit the particular fibrous material involved.

According to the present invention an agricultural machine for forming a round bale of windrowed fibrous material comprises a displaceable chassis carrying spaced apart side plates defining the width of a bale-forming chamber, a pick-up device located towards a forward end of the chassis and adapted to pick-up fibrous material from the ground and to discharge the fibrous material on to a carrying surface, which extends generally horizontally, of a first, fixed position belt conveyor defining the bottom of the chamber, and having a head end adjacent the pick-up device and a return end remote from the pick-up device, and serving to carry the fibrous material away from the pick-up device, and a plurality of additional belt conveyors each having an active surface adapted to co-operate with the carrying surface of the first, fixed position belt conveyor in the forming of a bale by the rolling of fibrous material, at least one of the additional belt conveyors being movable by having one end pivotably mounted, so that its other end is arcuately movable from an inner position to an outer position as the bale diameter progressively increases, means to urge the movable conveyor(s) towards the inner position and means to displace at least one of the belt conveyors whereby a finished bale may be discharged from a rearward end of the machine.

Thus, in use, a bale is formed initially between the co-operating belt surfaces, the one or more movable, additional conveyors being displaced from its or their inner position as the bale diameter increases, so that by varying the inward urge on the or each movable conveyor, the bale density may be controlled.

In a first embodiment, two movable conveyors are employed, a first movable conveyor having one end pivotally mounted adjacent the return end of the first, fixed conveyor, and a second movable conveyor having one end pivotably mounted in the vicinity of both the head end of the first conveyor and the pick-up device. This embodiment may also incorporate a second, fixed conveyor spaced above the first, fixed conveyor by a distance approximating to the diameter required for a finished bale. Furthermore, each side plate is conveniently formed in two parts, a forward part being rigidly secured with respect to the chassis, and a rearward part being pivotally mounted with respect to the chassis to allow discharge of a finished bale. In detail, the two rearward parts, the second, fixed position conveyor and the second movable conveyor may be integrated into a sub-assembly pivotally attached to the forward parts of the side plates.

In a second embodiment, only one movable conveyor is provided having one end pivotally mounted in the vicinity of both the head end of the first conveyor and the pick-up device.

The movable conveyor(s) may be spring urged into the inner position, the build up in diameter of the bale overcoming the spring loading to cause displacement of the arcuately movable conveyor end(s). Alternatively, the movable conveyor(s) may be urged into the inner position by hydraulic piston and cylinder units, with a hydraulic circuit incorporating adjustment means whereby the urge on the conveyor(s) may be varied. It follows that the spring or hydraulic loading determines the bale density. Yet again, the movable conveyor(s) may be displaced mechanically by the operator. Thus the operator is able to roll a bale having a relatively hard or a relatively soft core in accordance with whatever kind of bale is required.

In principle, the chassis may be self-propelled or may be towed or pushed by a tractor. The belt of each conveyor may extend the full width of the machine, or alternatively each conveyor may incorporate a multiple number of individual endless belts. With the latter arrangement, the width of the chamber may be adjustable to provide multiple bale lengths, e.g. 4-ft. or 6-ft., by providing side plates that are adjustable in position. Thus, with a plurality of belts of 6" width forming e.g. a movable conveyor, the two outer belts and their rollers may be removable when it is desired to increase from a 4-ft. bale to a 5-ft. bale. It follows that the rollers and belts are re-inserted when changing back to a 4-ft. bale. In detail, each side plate may be provided with a plurality of slide pins, e.g. three, each engaging a slide sleeve carried by support means extending upwardly from the chassis. Each sleeve may have an aperture to receive a retaining pin to engage a selected one of two apertures dependent upon the position required for the individual side plates.

Preferably, the machine incorporates a bale wrapping unit comprising a spool of synthetic plastics wrapping material, e.g. polythene, which, after the bale has been formed, and before discharge of the finished bale from the machine, is wrapped around the bale periphery, e.g. several times, the synthetics plastics material then being cut and overlapped ends being secured e.g. by adhesive tape or twine. Thus, such a bale is completely weatherproof and no peripheral weathering damage occurs. In detail, the wrapping unit may be mounted on the or one movable conveyor, the unit preferably comprising support rollers for the spool, means to drive such rollers, a brake for the wrapping material, drive rolls for the wrapping material and a cutting or perforating device.

The invention will now be described in greater detail, by way of examples, with reference to the accompanying drawings, in which.

In both embodiments, like components are accorded like reference numerals.

Figure 1:
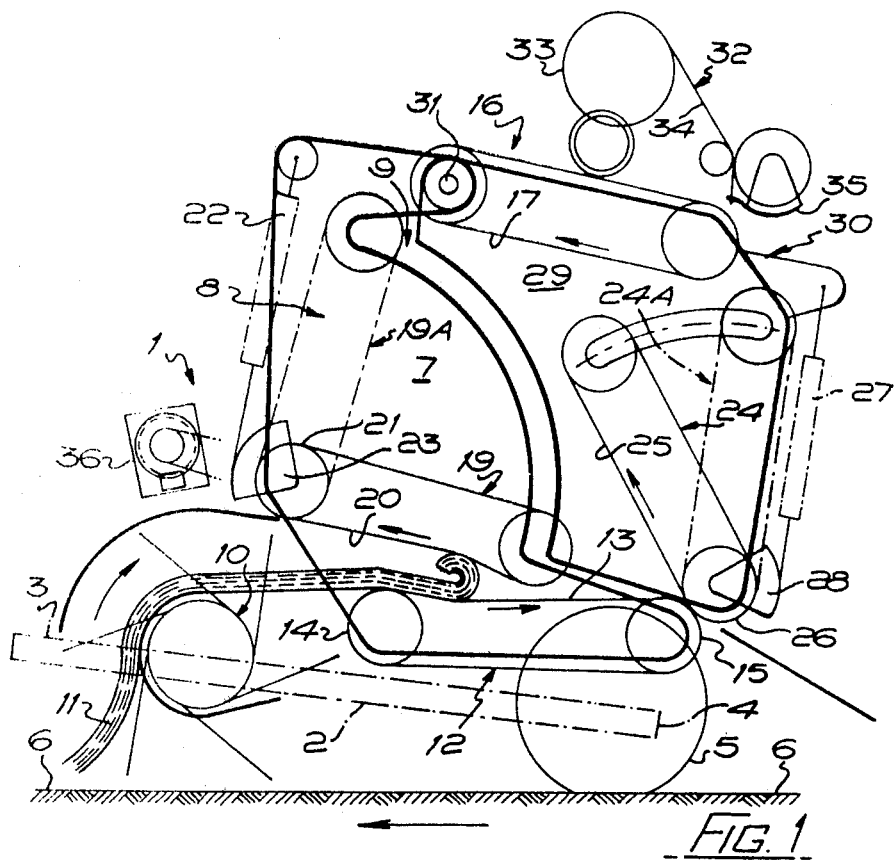
FIGS. 1 to 4 are side elevations of a first embodiment of machine, indicating the progressive formation of a round bale, until the discharge of a finished, formed and wrapped bale from the machine.

An agricultural machine 1 comprises a displaceable chassis 2 having a forward end 3 and a rearward end 4 supported by a pair of wheels 5, engaging the ground 6, the chassis being of the trailer type adapted to be towed by a tractor (not shown). The chassis 2 carries forward parts 7 of a pair of spaced apart side plates 8, which side plates together define the width of a bale forming chamber 9. Towards the forward end 3 of the chassis is located a conventional pick-up device 10 for windrowed fibrous material 11, the device 10 being displaceable between operative and non-operative positions. A first, fixed position belt conveyor 12 provides an active, material carrying surface 13 which defines the bottom of the chamber 9 having a head end 14 and a return end 15.

Figure 3:
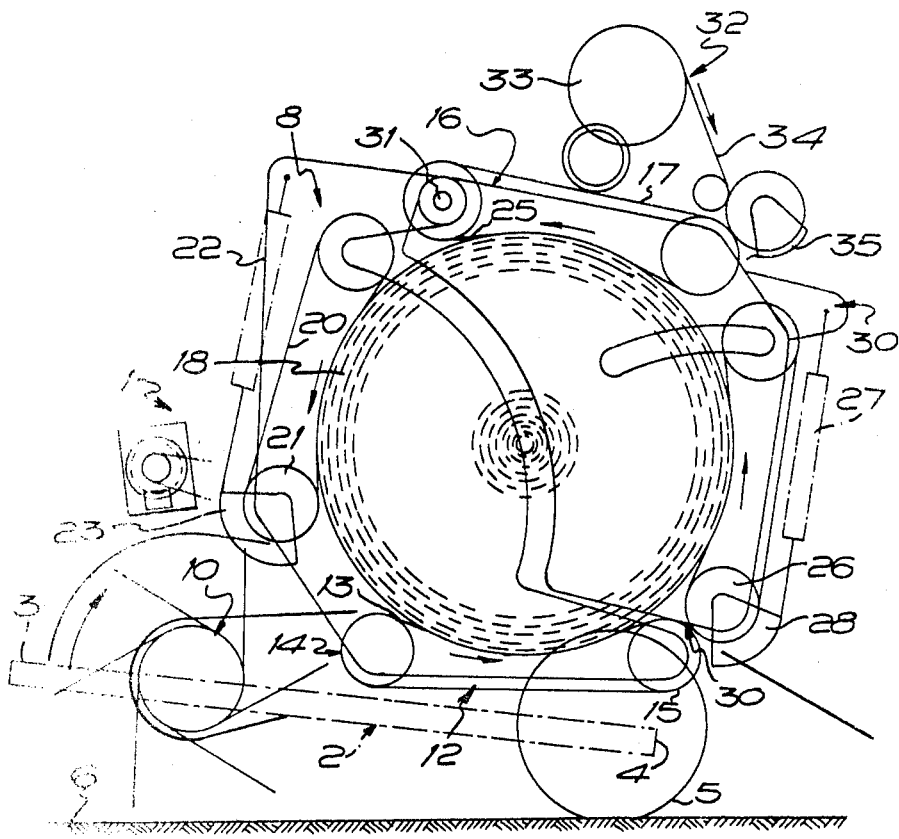
Figure 4:
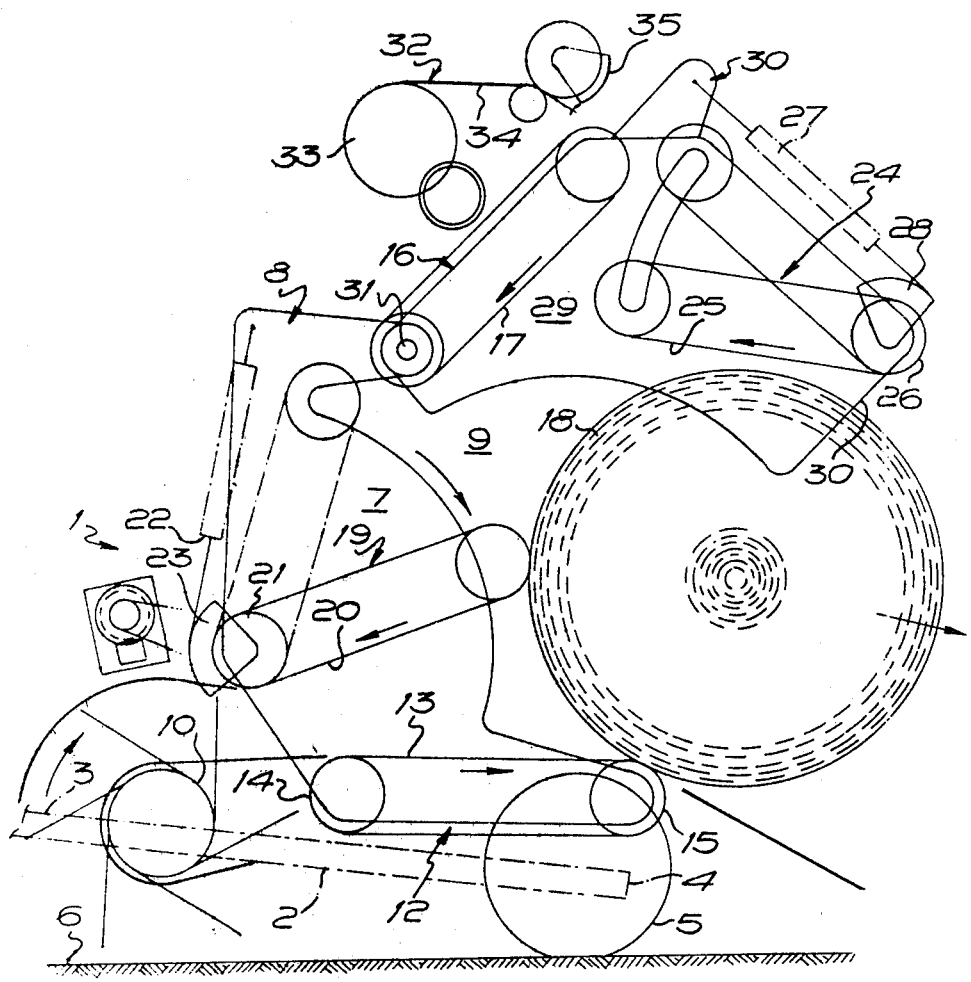

In the first embodiment there is provided a second, fixed position conveyor 16 having an active surface 17 spaced upon the first, fixed conveyor 12, and in particular from the carrying surface 13 by a distance approximating to the diameter required for a finished bale 18 (FIGS. 3 and 4). A first, movable conveyor 19 having an active surface 20 has one end 21 pivotally mounted in the vicinity of the pick-up device 10. In FIG. 1 the first, movable conveyor 19 is illustrated in full line in its inner position, its outer position being indicated in chain dotted line at 19A, the conveyor 19 being constantly urged to its inner position by a plurality of springs 22 connected between a component 23 of the conveyor 19 and a side plate 8. A second, movable conveyor 24 with an active surface 25 has one end 26 pivotally mounted adjacent the return end 15 of the conveyor 12. Again the inner position of the conveyor 24 is indicated in full line in FIG. 1, and the outer position is indicated in chain dotted line at 24A. Springs 27 are also connected between a component 28 of the conveyor 24 and a side plate 8.

Figure 2:
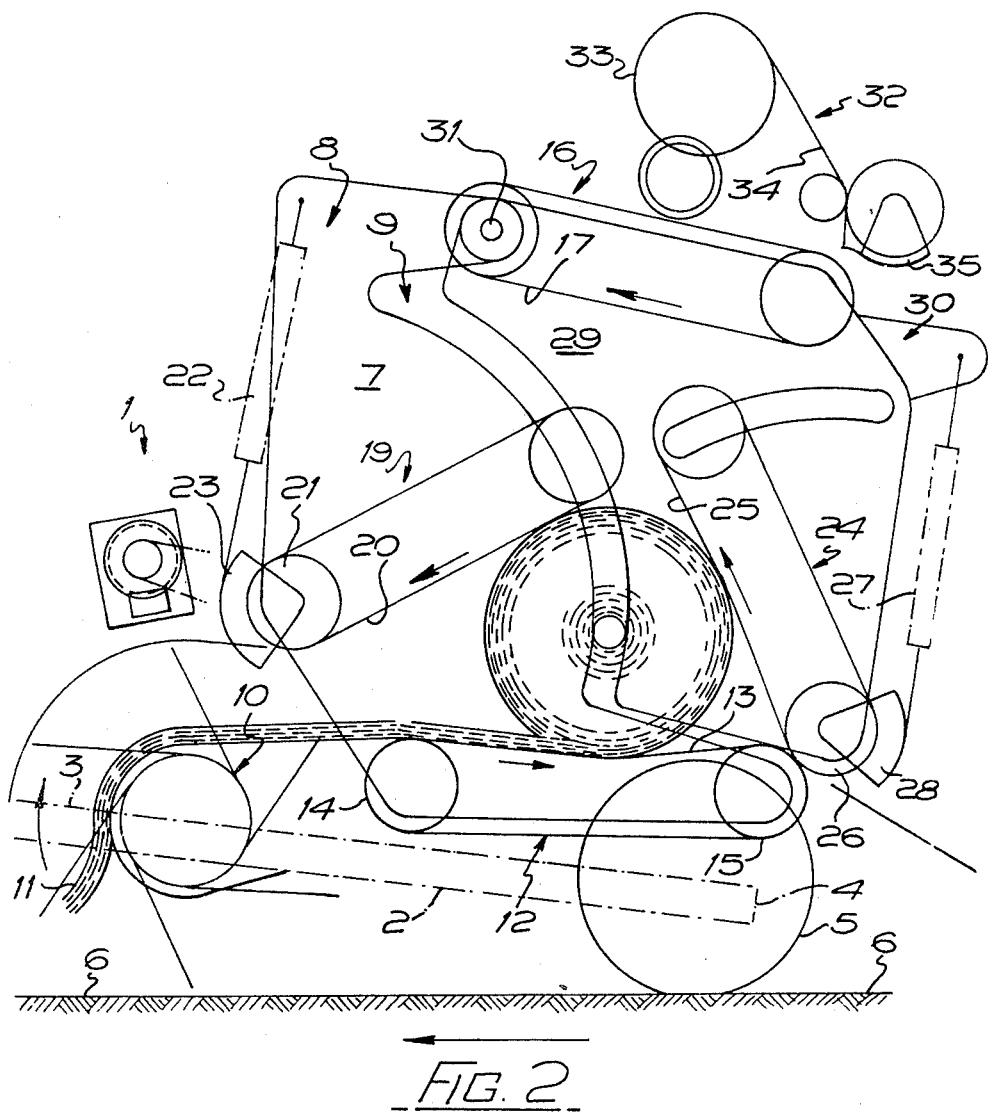

The side plates 8 are completed by rearward parts 29 on which the conveyors 16 and 24 are mounted, to provide a sub-assembly 30, pivotally attached at 31 to the forward parts 7 so as to be displaceable e.g. under the control of a double-acting ram, from the closed sub-assembly position shown in FIGS. 1 to 3, to the open position shown in FIG. 4 when it is desired to discharge a finished bale 18 from the rearward end of the machine 1.

The sub-assembly 30 also supports a bale wrapping unit 32 comprising a reel 33 of wrapping material 34, e.g. polythene, together with a pair of co-operable drive rolls for feeding the wrapping material 34 and a cutting or perforating device 35.

Power is supplied to the various conveyors from a conventional tractor power take-off, operable through a 90° worm and wheel gearbox 36.

In use, windrowed fibrous material 11, is picked up from the ground 6 by the pick-up device 10 and discharged on to the material carrying surface 13 of the first, fixed conveyor 12 which, in co-operation with the active surface 20 of the first, movable conveyor 19 begins formation of the bale as illustrated in FIG. 1, both the first and second movable conveyors 19 and 24 being at their inner positions under the influence of the springs 22 and 27 respectively. Pick-up of material 11 continues as the chassis 2 is advanced over the ground 6. As illustrated in FIG. 2, a bale 18 is now recognisable, the progressive increase in diameter of the bale 18 displacing the first movable conveyor 19 to an intermediate position illustrated in FIG. 2. In this position the bale 18 has just made contact with the active surface 25 of the second, movable conveyor 24. As illustrated in FIG. 3, the progressive increase in diameter of the bale 18 results in both the movable conveyors 19 and 24 being displaced from their inner position to their outer positions, and also in the active surface 17 of the second, fixed conveyor 16 becoming operative in the formation of the bale 18, completion of the formation being illustrated in FIG. 3, at which point movement over the ground 6 of the chassis 2 and/or pick-up device 10 is or are halted. At this point the wrapping reel 33 is activated, with the conveyors 12, 16, 19 and 24 continuing to be driven so that the bale 18 continues to rotate until a desired amount of wrapping material 34 has been externally applied, whereupon the cutting device 35 is operated to cut the wrapping material 34 and the free end of the wrapping material is secured by twine, adhesive tape etc. As illustrated in FIG. 4, the sub-assembly 30 is raised to the position illustrated so that the finished and wrapped bale 18 may be discharged from the rear of the machine, in a generally conventional manner, the machine then being ready to commence the formation of the next bale.

Figure 7:
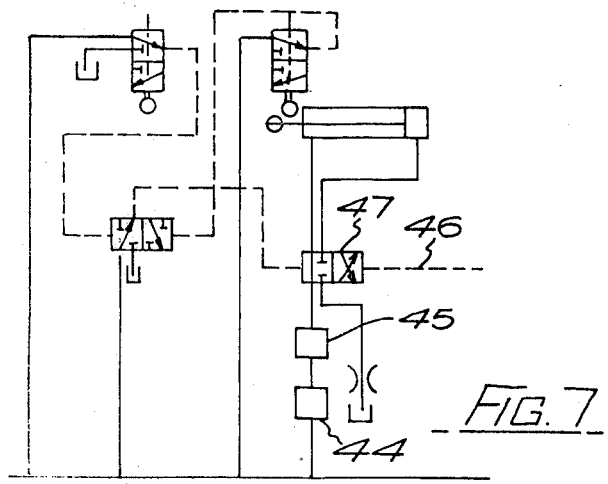
FIG. 7 shows part of a hydraulic circuit for use with the embodiment of FIGS. 5 and 6.
Figure 5:
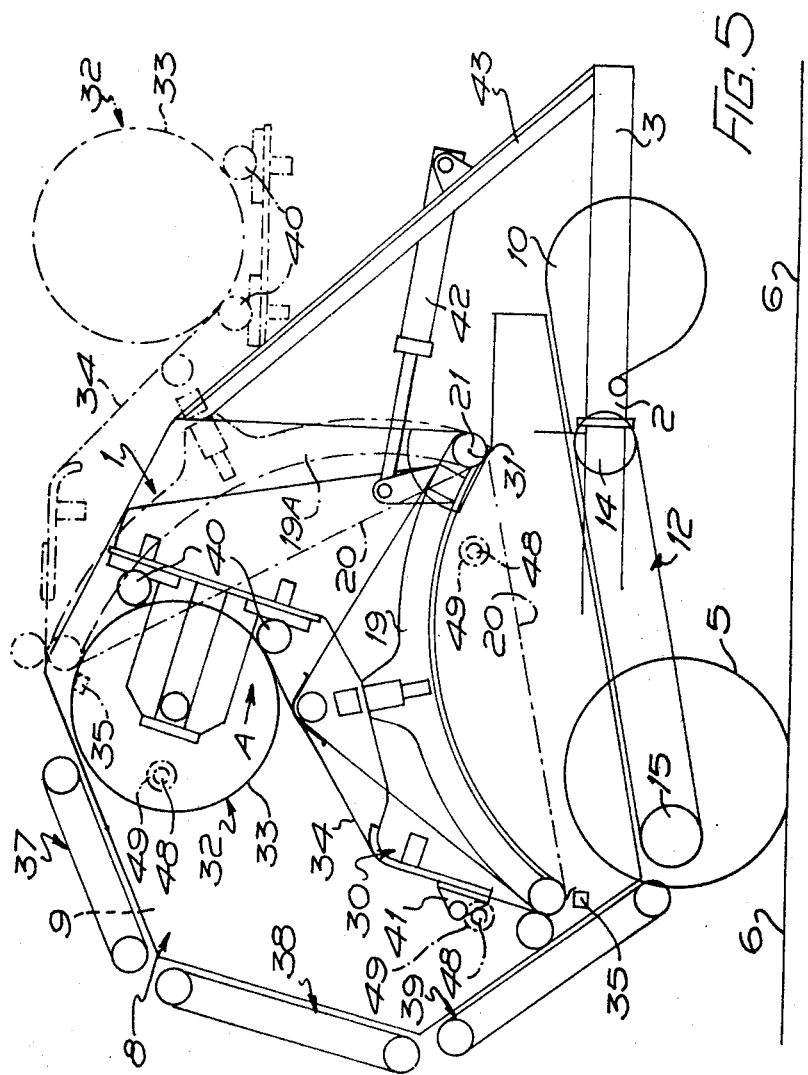
FIG. 5 is a side elevation of a second embodiment of machine.
Figure 6:
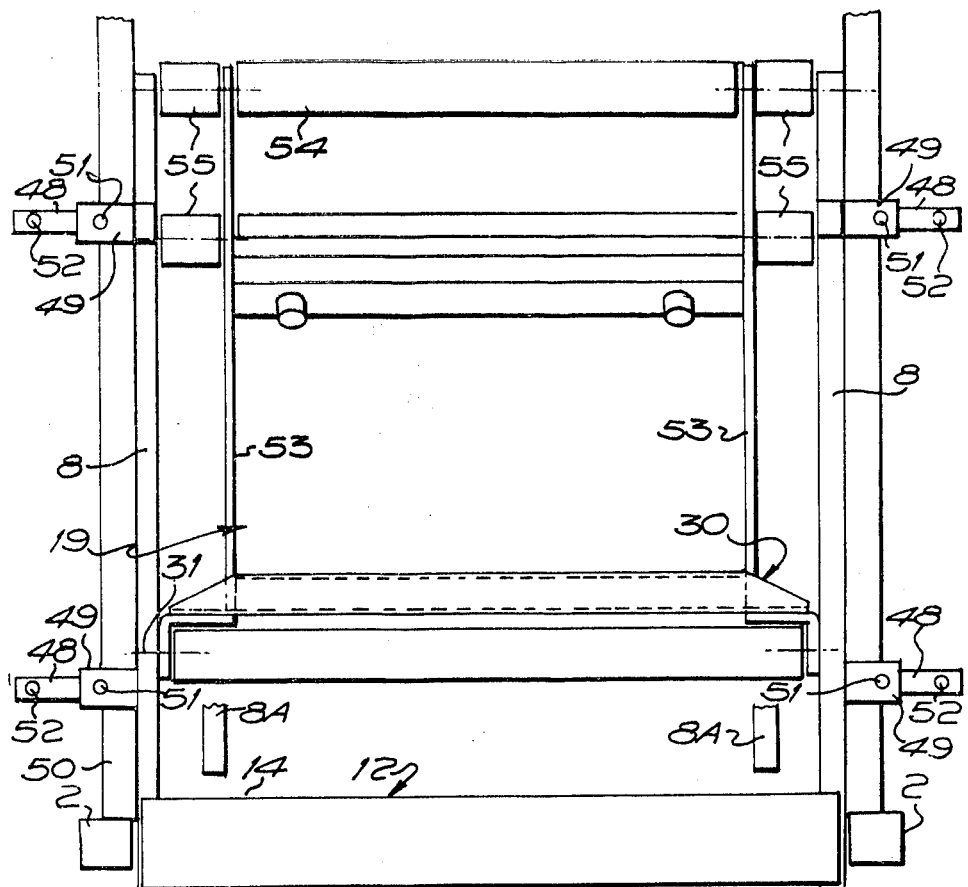
FIG. 6 is a view in the direction of arrow A of FIG. 5.

In the embodiment of FIGS. 5, 6 and 7, the machine only incorporates one movable conveyor 19. However, this embodiment also incorporates three further belt conveyors, 37, 38 and 39, which are fixed in position during baling but which are displaceable after baling has been completed, to allow a finished and wrapped bale 18 to be removed from the rear of the machine. Again baling commences with the conveyor 19 in its inner position illustrated in full line in FIG. 5, with baling initially effected by the carrying surface 13 of the first, fixed position conveyor 12, and active surfaces of the conveyors 19 and 39. Again, as the diameter of the bale 18 increases the movable conveyor 19 is displaced to its outer position illustrated in chain dotted line at 19A in FIG. 5, the active surfaces of the conveyors 38 and 37 coming into use as the bale diameter increases. Also illustrated in FIGS. 5 and 6 are a pair of drivable rolls 40 supporting the reel and a brake 41 for the wrapping material 34.

Instead of being urged by spring means into its inner position as in the first embodiment, the conveyor 19 can be controlled by a pair of hydraulic rams 42 connected between a strut 43 and the movable conveyor 19. As indicated in FIG. 7, an adjustable, pressure reducing valve 44 enables loading by the rams 42 on the conveyor 19 to be controlled and/or varied and hence the bale density to be controlled or varied. A pressure relief valve is indicated at 45 and a pilot line 46 leading to a control valve 47, the pilot line 46 conveying a signal from an ejecting ram for the bale forming chamber 9, when that ram is fully open. Other components of the circuit will be readily understood by those skilled in the art.

In FIG. 6 is illustrated the possibility of varying the width of the chamber 9 and hence the length of a bale 18. Thus, the side plates 8 are provided with three slide pins 48 individually engaging slide sleeves 49 carried by a support means 50 extending upwardly from the chassis 2. Each sleeve 49 has an aperture 51 to receive a retaining pin (not shown), while the slide pins 48 are provided with two apertures 52 (one only visible), a selected one of which is engaged by a retaining pin. Also as illustrated in FIG. 6, the movable conveyor 19 comprises support plates 53 carrying both inboard rollers 54 around which are wrapped a plurality of individual belts, and outboard rollers 55, each adapted to carry an individual belt, outboard rollers 55 being removable, together with their individual belts, when it is desired to move the side plates 8 inwardly from the position illustrated in FIG. 6 defining a 4-ft. wide chamber 9 for forming a 4-ft. long bale 18, to a position in which the side plates 8 attain the position shown in chain dotted line at 8A for the formation of a 5-ft. long bale 18.

What I claim is:

1. An agricultural machine for forming a round bale of windrowed fibrous material comprising a displaceable chassis having a forward end and a rearward end, spaced apart side plates carried by said chassis and defining the width of a bale-forming chamber, a pick-up device located towards said forward end of said chassis and adapted to pick-up fibrous material from the ground, a carrying surface on to which said fibrous material is discharged by said pick-up device, said carrying surface extending generally horizontally, and being part of a first, fixed position belt conveyor defining a bottom of said bale forming chamber and having a head end adjacent said pick-up device and a return end remote from said pick-up device and serving to carry said fibrous material away from said pick-up device, and a plurality of additional belt conveyors each having an active surface adapted to co-operate with said carrying surface of said first, fixed position belt conveyor in the forming of a round bale by the rolling of said fibrous material, at least one of said additional belt conveyors being movable by having one conveyor end pivotably mounted, so that its other end is arcuately movable from an inner position to an outer position as said round bale progressively increases in diameter, means to urge said movable conveyor towards said inner position and means to displace at least one of said belt conveyors whereby a finished bale may be discharged from a rearward end of said machine.

2. An agricultural machine as claimed in claim 1, wherein two movable conveyors are employed, a first movable conveyor having one end pivotally mounted in the vicinity of both said head end of said first, fixed position conveyor and said pick-up device, and a second movable conveyor having one end pivotably mounted adjacent said return end of said first, fixed conveyor.

3. An agricultural machine as claimed in claim 2, wherein a second, fixed position conveyor is spaced above said first, fixed position conveyor by a distance approximating to the diameter required for a finished bale.

4. An agricultural machine as claimed in claim 1, wherein each of said side plates is formed in two parts, a forward part being rigidly secured with respect to said chassis, and a rearward part being pivotally mounted with respect to said chassis to allow discharge of a finished bale.

5. An agricultural machine as claimed in claim 4, wherein said two rearward parts, said second, fixed position conveyor and said second movable conveyor are integrated into a sub-assembly pivotally attached to said forward parts of said side plates.

6. An agricultural machine as claimed in claim 1, wherein only one movable conveyor is provided, said movable conveyor having one end pivotably mounted in the vicinity of both said head end of said first, fixed position conveyor and said pick-up device.

7. An agricultural machine as claimed in claim 1, wherein said movable conveyor is spring urged to said inner position, the build up in diameter of said bale overcoming the spring loading to cause displacement of said arcuately movable conveyor end.

8. An agricultural machine as claimed in claim 1, wherein said movable conveyor is urged into said inner position by hydraulic piston and cylinder units with a hydraulic circuit incorporating adjustment means.

9. An agricultural machine as claimed in claim 1, wherein said chassis is a trailer adapted to be towed or pushed by a tractor.

10. An agricultural machine as claimed in claim 1, wherein said side plates are adjustable in position to vary said width of said bale forming chamber.

11. An agricultural machine as claimed in claim 10, wherein each side plate is provided with a plurality of slide pins, while support means extending upwardly from said chassis carries a corresponding plurality of slide sleeves each engaged by one of said slide pins.

12. An agricultural machine as claimed in claim 11, wherein each sleeve has an aperture to receive a retaining pin to engage a selected one of two holes in each slide pin.

13. An agricultural machine as claimed in claim 1, incorporating a bale wrapping unit comprising a spool of synthetic plastics material which, after said bale has been formed, and before discharge of a finished bale from said machine, is wrapped around the bale periphery.

14. An agricultural machine as claimed in claim 13, wherein said wrapping unit is mounted on said movable conveyor.

15. An agricultural machine as claimed in claim 13, wherein said wrapping unit incorporates support rollers for said spool.

16. An agricultural machine as claimed in claim 13, wherein said wrapping unit incorporates a brake.

17. An agricultural machine as claimed in claim 13, wherein said wrapping unit incorporates a cutting or perforating device.

* * * * *